United States Patent

[11] 3,577,075

| [72] | Inventor | Algirdas J. Krygeris<br>Richmond Heights, Ohio |
|---|---|---|
| [21] | Appl. No. | 775,664 |
| [22] | Filed | Nov. 14, 1968 |
| [45] | Patented | May 4, 1971 |
| [73] | Assignee | Gilmore Industries, Inc.<br>Cleveland, Ohio |

[54] DIGITAL SERVO INDICATOR
4 Claims, 2 Drawing Figs.

[52] U.S. Cl. .................................................. 324/99,
324/130
[51] Int. Cl. ...................................................... G01r 17/06,
G01r 1/02
[50] Field of Search .......................................... 324/99, 99
(D), 130; 340/347 (A—D); 318/138, 20, 110

[56] References Cited
UNITED STATES PATENTS

| 3,149,282 | 9/1964 | Wasserman ................... | 324/99 |
| 3,158,026 | 11/1964 | McGhee ........................ | 324/99X |
| 3,201,781 | 8/1965 | Holland ......................... | 340/347 |
| 3,239,759 | 3/1966 | O'Hara .......................... | 324/99 |
| 3,418,547 | 12/1968 | Dudler .......................... | 318/138 |

Primary Examiner—Rudolph V. Rolinec
Assistant Examiner—Ernest F. Karlsen
Attorney—Bosworth, Sessions, Herrstrom & Cain

ABSTRACT: An automatic, null-balance potentiometric device having a digital readout in which the rate of balance is proportional to the magnitude of the error and balance is approached asymptotically on an exponential curve, such device providing improved damping characteristics and noise reduction whereby accurate resolution to a hundredth of a microvolt is obtained.

PATENTED MAY 4 1971 3,577,075

INVENTOR.
ALGIRDAS J. KRYGERIS

BY Bosworth, Sessions,
Herrstrom & Cain

ATTORNEYS.

3,577,075

DIGITAL SERVO INDICATOR

BACKGROUND OF INVENTION

1. Field of Invention

This invention relates to servo indicators and, more particularly, to digital servo indicators using the continuous null-balance potentiometric principle to measure and balance unknown signals in the submicrovolt range and readout the results, digitally, in the desired engineering units.

2. Description of the Prior Art

Prior-art servo indicators have used the null-balance potentiometric principle to balance unknown voltages and to provide a digital readout in the desired engineering values or units. In some such prior-art devices the balance is approached linearly at a single rate, in which instance the damping is often ineffective and the null or balance point is frequently overshot with the result that balance must then be approached from the other direction, also at a single rate of correction, and so on, like a pendulum coming to rest, until the null point is reached.

Other such prior-art devices have attempted to overcome the problem of overshooting by having two linear rates of correction, using a faster rate when the error signal is large and changing to or using a slower, but likewise linear rate of correction, when the error signal is at or less than a predetermined limit.

SUMMARY OF THE INVENTION

It is, therefore, a general object of this invention to provide a new and improved servo indicator of the null-balance potentiometric type. Another object of this invention is to provide a new and improved servo indicator of the null-balance potentiometric type having new and improved circuitry whereby improved noise filtering and elimination and damping at the approach to balance is obtained.

Another object of this invention is the provision of a new and improved servo indicator of the null-balance potentiometric type which has a narrow bandwidth at or near balance, which prevents overshooting of the balance position and which controls and provides a rate of error correction, which is a function of the magnitude of the error signal, so that the approach to balance is at a progressively slower rate, substantially asymptotic to the balance, and balance is therefore approached rapidly when the error signal is large but slowly, yet still in proportion to the error signal, when the error signal is small.

Still other objects of this invention include the provision of a new and improved servo indicator of the null-balance type which utilizes a pulse rate proportional to the imbalance to obtain resolution down to one-hundredth of a microvolt with accompanying elimination of noise and transient signals at and around balance; and the provision of such a servo indicator which includes a voltage to frequency converter generating a pulse train of repetition rate proportional to the magnitude of the error signal; and which is faster and has greater accuracy than the prior-art devices upon which it has improved.

Still other objects of this invention include the provision of a new and improved servo indicator which obtains one or more of the objects and advantages set forth above. These and other objects and advantages of this invention will become apparent from the following description of a preferred form thereof reference being made to the accompanying drawings.

DESCRIPTION OF THE PREFERRED EMBODIMENTS

Figure 1:
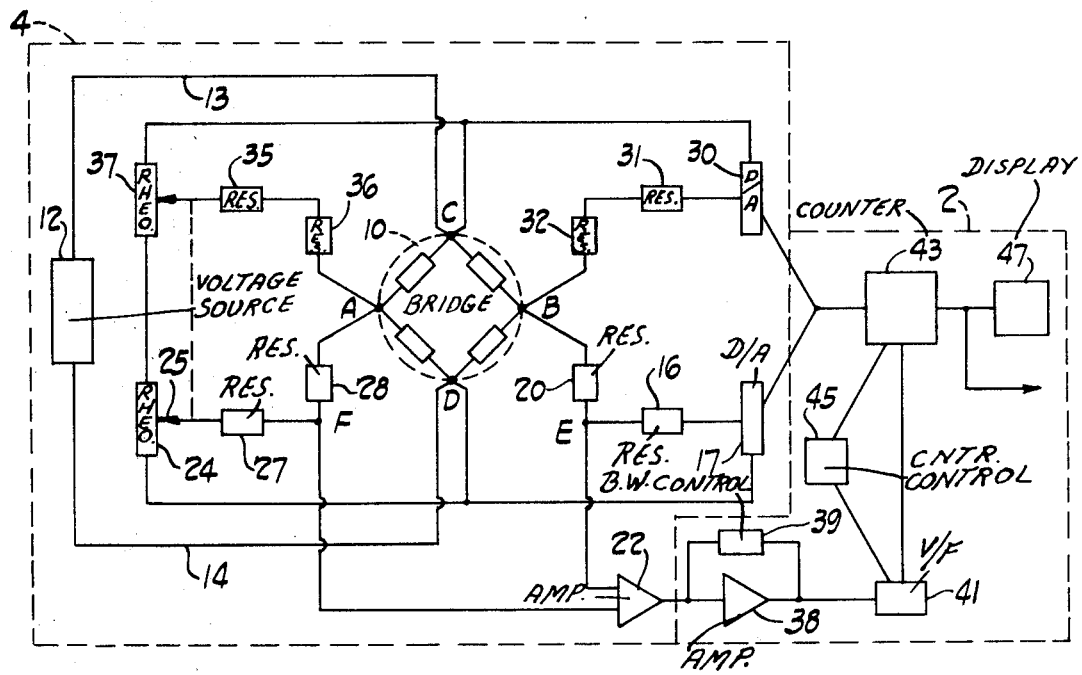
FIG. 1 is a block diagram of a servo indicator embodying a preferred form of this invention.

A servo indicator embodying a preferred form of this invention is depicted in FIG. 1 and includes a response and correction circuit indicated generally within the dotted lines at 2 and a measuring circuit indicated generally within the dotted lines at 4. The response and correction circuit 2 according to the invention includes means whereby the said circuit varies the rate of corrections, which balance the measured error, in proportion to the magnitude of the error. Thus the rate of correction, which is always proportional to the error, is greater or faster when the error is large and less or slower when the error is small with the result that balance is approached asymptotically on an exponential curve thereby preventing overshooting. Because of this feature the correction signals near balance are of relatively low frequency thereby reducing noise and transient signals at and near balance whereby resolutions of the order of a hundredth of a microvolt are obtained.

In the preferred embodiment of this invention, the measuring circuit receives an unknown voltage from, for example, a bridge 10, which is indicated in phantom as it is normally external of the servo indicator, having as one arm a transducer which, in a conventional way, generates a DC voltage in response to the changing value of a given parameter such as temperature, pressure or the like, which the indicator is to measure.

As shown in FIG. 1 the measurement or imbalance or error detection circuit 4 includes means to sense the unknown voltage to be measured produced by imbalance of the bridge 10. The unknown input voltage is connected to inputs A and B of the measuring circuit while the supply voltage 12 is connected by means of leads 13 and 14, to points C and D of the bridge. The structure is such that the response and correction circuit 4 responds to an imbalance between the ratios of the voltage DB to BC and DA to AC to cause a feedback voltage to offset the imbalance. This feedback voltage which is coupled through resistor 16 to oppose the voltage at point B from the bridge 10 is the measure or equal of the unknown voltage when the measuring circuit is in balance. The readout, which is proportional to the voltage necessary to balance the unknown voltage is preferably expressed in engineering units of the parameter being measured or determined.

To this end the imposed opposition voltage, which attempts to balance the unknown is produced in the digital-to-analog converter 17 and is combined with the unknown voltage at point B in resistor 20. The resulting error or imbalance signal as determined by the difference between the unknown voltage and the opposition voltage appears at point E and is connected to one input of a differential amplifier 22 of the well-known chopper type.

Measuring circuit 4 also preferably includes means for zeroing the circuit for a no load condition comprising rheostat 24 with wiper 25 and resistors 27 and 28. The opposite pole of the unknown voltage, point A, is coupled through resistor 28 to point F which is connected to the remaining input of differential amplifier 22. When the bridge is balanced the output voltage from rheostat 24 may be varied so that the signal appearing at point F is equal to the signal at point E. Amplifier 22 is thus set to zero output at bridge balance.

Also, to ensure that there is no measuring circuit current flow into or out of point B to affect the balance of bridge 10, there is provided a balancing circuit comprising digital-to-analog converter 30 and resistors 31 and 32 which balances the load or impedance presented to point B by digital-to-analog converter 17 and resistors 16 and 20. Also, in order that the impedance looking into point A will be equal to that looking into point B, there is provided an additional rheostat 7 and resistors 35 and 36 connected to point A. The values of the resistors in the balancing circuits are chosen and the circuits matched so that the measuring circuit 4 is symmetrical in all respects and no measuring circuit current or impedance will affect the bridge 10.

With the circuits so matched any measuring circuit current flowing into point B through resistor 20 is matched by an equal and opposite current through resistor 32 so that there is no net measuring circuit current flow into or out of point B. As shown in the drawing the output of counter 43 is entered into digital-to-analog converter 30 to produce a balance signal equal to the feedback signal from digital-to-analog converter 17.

In like manner rheostat 37 and resistors 35 and 36 ensure that there is no net measuring circuit current flow into or out of point A to affect the bridge. As indicated by the dashed line between them, the wipers of rheostats 24 and 37 are moved together so that the proper relation between the voltages appearing at the two wipers is maintained when the bridge is balanced.

Digital-to-analog converter 7 is adapted to receive a digital signal from the response circuit 2 and add or subtract voltages, in accordance with the commands of circuit 2 in a Kelvin-Varley or equivalent circuit to oppose the unknown voltage and offset the imbalance of the bridge 10. The magnitude of the opposition voltage when the measuring circuit is in balance is, of course, equal to the magnitude of the unknown voltage and is therefore a measure of the parameter being determined.

The imbalance between the voltages at points E and F is sensed and amplified by differential amplifier 22. In amplifier 22 a double chopper converts the DC voltage difference to a square wave AC signal which is in turn amplified and then demodulated or returned to a DC signal. The output of differential amplifier 22 is then entered into an operational amplifier 38 connected as a filter/integrator across the terminals of which is connected a bandwidth control circuit 39. In order to obtain the objects of this invention the output of amplifier 38, the amplifier imbalanced voltage, is converted within a voltage-to-frequency converter 41 into a pulse train, the repetition rate of which is directly proportional to the magnitude of the voltage input to the voltage-to-frequency converter 41. Further, the voltage-to-frequency converter 41 is a bipolar unit which causes the feedback voltage to increase or decrease as required for either polarity of error signal.

The output of the converter 41 goes by one lead to an electronic up-down counter 43 of the binary coded decimal (BCD) type which is responsive to the pulses and is incremented or decremented thereby and by a second lead to an up-down control 45 to control the direction of counting of counter 43 according to the polarity of the imbalance signal, and thence to the counter 43. The signal passing directly from the converter 41 to the counter 43 controls the rate and amount of counting and thereby the rate and amount of the correction to the imbalance. The signal passing to the counter via the control 45 controls the direction of counting of the counter 43 since the control 45 detects the polarity of the imbalance voltage.

Since the repetition rate of the pulses from the converter 41 is proportional to the magnitude of the measuring circuit imbalance it follows that the correction is faster the greater the imbalance and slows in proportion to the nearness to null balance. The output of up-down counter 43, which is a digital signal, controls the digital-to-analog converter 17 to cause it to add or subtract opposition voltage.

Counter 43 is a binary coded decimal counter and the output therefrom not only controls the digital-to-analog converter 7 to control the opposition or balancing voltage but also controls a digital display 47, for example, or, via lead 48, an accessory device in a manner well known in the art.

The bandwidth control circuit 39 provides a narrow bandwidth to amplifier 38 with the result, in view of the constantly changing speed with which balance is approached, that there is no overshooting of the balance point and noise and stray signals are eliminated. The use of the narrow bandwidth amplifier 38 is permitted without sacrificing accuracy or speed of measurement by the use of voltage-to-frequency converter 41 to control the rate of imbalance correction.

Thus with the apparatus of this invention resolutions can be obtained in the thousandths of a millivolt range with balance being approached rapidly in the first instance and then proportionally slower until the balance is approached substantially asymptotically and overshooting is avoided.

Figure 2:
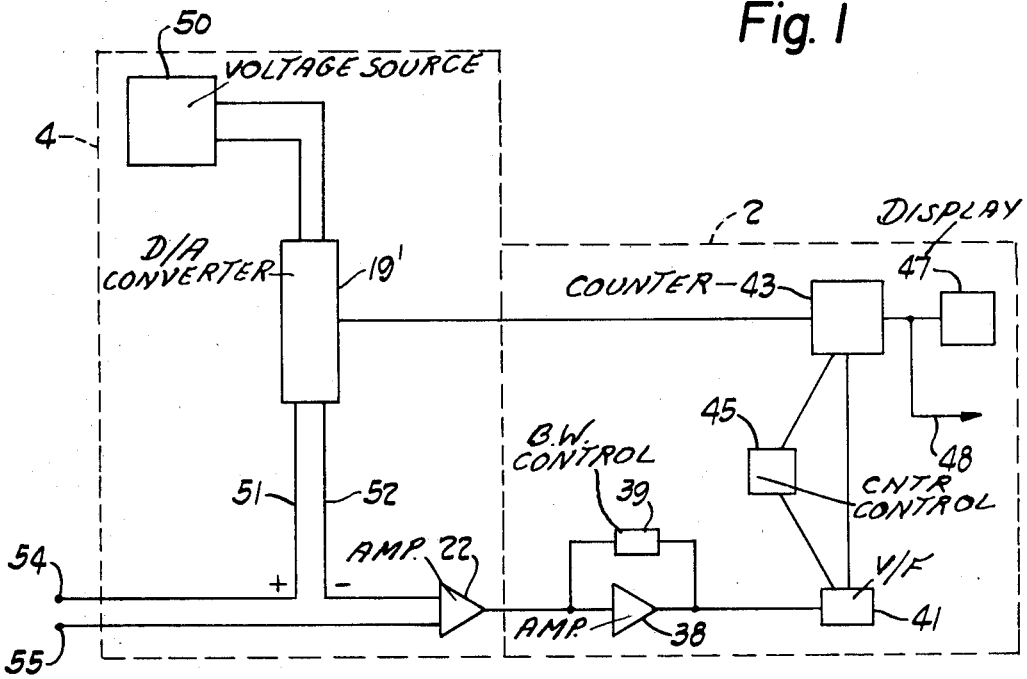
FIG. 2 is a block diagram of another servo indicator having a response and correction circuit embodying a preferred form of this invention.

A modified servo indicator according to this invention is shown in FIG. 2 wherein like reference characters refer to like parts as in FIG. 1.

In this instance the measuring circuit 4 includes a source of known voltage 50 regulated and temperature stabilized to a predetermined degree in a known manner and a digital-to-analog converter 19', also, preferably of the Kelvin-Varley type, for producing a known voltage to balance the unknown. This known voltage from digital-to-analog converter 19' is connected by means of leads 51, 52 in opposition to the unknown voltage appearing at terminals 54, 55. The resulting difference signal is connected to differential chopper amplifier 22 which produces an amplified DC signal proportional to the difference between the known and unknown input voltages. The output of differential amplifier 22 is utilized as described above in conjunction with FIG. 1 to vary the known voltage from digital-to-analog converter 19' a known amount to balance the unknown. In this example the transducer producing the unknown voltage is not excited from the measuring circuit supply 50 as the bridge 10 was excited from the supply 12 in FIG. 1.

Thus this invention provides a servo indicator having a unique combination of high resolution and high accuracy for measurements of low-level DC signals by means of continuous balancing of the signals from transducers against a known voltage.

Modifications and changes to the preferred forms of the invention disclosed herein may occur to those skilled in the art who come to understand the principles and precepts thereof. Accordingly, the scope of the patent to be issued hereon should not be limited to the forms of the invention herein specifically depicted and described but by the advance by which the invention has promoted the art.

I claim:

1. A digital voltmeter for measuring an unknown voltage produced by the unbalance of a bridge comprising:

first digital-to-analog converter means for producing a known variable voltage, said known voltage being connected in opposition to said unknown voltage so that the difference therebetween constitutes an error signal, a voltage-to-frequency converter for converting said error signal to a series of pulses having a repetition rate proportional to the magnitude of said error signal, the constant of proportionality remaining the same throughout the measurement, a bidirectional counter controlling said first digital-to-analog converter means and adapted to be incremented or decremented by said pulses, means responsive to the polarity of said error signal for enabling said counter to be incremented by said pulses for one polarity and decremented by said pulses for the opposite polarity, and second digital-to-analog converter means connected to said unknown voltage and to said first digital-to-analog converter means for cancelling the net flow of measurement circuit current between said first digital-to-analog converter means and said bridge.

2. The digital voltmeter of claim 1 further comprising rheostat means coupled to an output terminal of said bridge for zeroing said digital voltmeter when said bridge is balanced.

3. The digital volt meter of claim 2 further comprising second rheostat means coupled to an output terminal of said bridge and to said rheostat means for cancelling the net flow of measurement circuit current between said zeroing rheostat means and said bridge.

4. The digital voltmeter of claim 3 wherein said first digital-to-analog converter means and said second digital-to-analog converter means are connected to a first output terminal of said bridge, said zeroing rheostat means and said second rheostat means are connected to a second output terminal of said bridge, and the impedance presented to said first output terminal of said bridge by the combination of said digital-to-analog converter and said second digital-to-analog converter is equal to the impedance presented to said second output terminal of said bridge by the combination of said zeroing rheostat means and said second rheostat means.